United States Patent [19]
Riu

[11] Patent Number: 5,988,015
[45] Date of Patent: Nov. 23, 1999

[54] DRIVE DEVICES

[75] Inventor: Hervé Riu, La Murette, France

[73] Assignee: Holset Engineering Co., Limited, United Kingdom

[21] Appl. No.: 08/894,286

[22] PCT Filed: Feb. 19, 1996

[86] PCT No.: PCT/GB96/00371

§ 371 Date: Oct. 27, 1997

§ 102(e) Date: Oct. 27, 1997

[87] PCT Pub. No.: WO96/25611

PCT Pub. Date: Aug. 22, 1996

[30] Foreign Application Priority Data

Feb. 17, 1995 [FR] France ................................. 95 01860

[51] Int. Cl.[6] .............................................. F16F 15/126
[52] U.S. Cl. ............................ 74/574; 464/90; 474/94
[58] Field of Search ............................ 74/574, 573 R, 74/572; 464/89, 90, 160; 474/94, 161, 902

[56] References Cited

U.S. PATENT DOCUMENTS

| | | | |
|---|---|---|---|
| 4,781,659 | 11/1988 | Gebhardt | 74/574 X |
| 5,449,322 | 9/1995 | Wagner | 74/574 X |

FOREIGN PATENT DOCUMENTS

| | | | |
|---|---|---|---|
| 0 012 669 | 6/1980 | European Pat. Off. . | |
| 31 07 371 | 9/1982 | Germany . | |
| 4018596 | 12/1991 | Germany | 464/90 |
| 44 20 178 | 12/1994 | Germany . | |
| 43 22 710 | 1/1995 | Germany . | |
| 44 04 311 | 4/1995 | Germany . | |
| 896 548 | 5/1962 | United Kingdom . | |
| 2121914 | 1/1984 | United Kingdom | 74/574 |
| 92/03669 | 3/1992 | WIPO . | |

OTHER PUBLICATIONS

Abstract, Laid Open Japanese Patent Application No. 7–238949, 1 page, English language, Sep. 12, 1995.
Japanese Patent No. 7–238949, Japanese language, front page, Sep. 12, 1995.
Patent Abstracts of Japan, Publication No. 07229538 A, Japanese Patent Office, English language, 1 page, Aug. 29, 1995.
Japanese Patent No. 7–229538, Japanese language, front page, Aug. 29, 1995.
Patent Abstracts of Japan, Publication No. 08004881 A, Japanese Patent Office, English language, 1 page, Jan. 12, 1996.
Japanese Patent No. 8–4881, Japanese language, front page, Jan. 12, 1996.

*Primary Examiner*—Mary Ann Battista
*Attorney, Agent, or Firm*—Akin, Gump, Strauss Hauer & Feld

[57] ABSTRACT

A device for driving a piece of equipment from a driving shaft has a torsional vibration damper and comprises a primary element for connection to the driving shaft and a secondary element for connection to the piece of equipment. A first elastic member surrounds the primary element and an inertia ring surrounds the first elastic member. The secondary element has a rim extending parallel to the longitudinal axis of the device, and the rim partly covers the inertia ring. A cylindrical ring is located between the rim and the inertia ring for providing friction and a radial guide bearing. The secondary element has a transverse covering integral with the rim extending radially inwardly toward the longitudinal axis of the driving shaft. A second elastic member is located between the transverse covering and the primary element.

13 Claims, 1 Drawing Sheet

DRIVE DEVICES

BACKGROUND OF THE INVENTION

The present invention relates to drive devices having torsional vibration dampers.

More particularly, the present invention relates to devices for driving at least one piece of equipment, from a driving shaft, having a torsional vibration damper for rotating masses, which devices comprise a primary element intended to be fixed to the driving shaft and a secondary element intended to be connected to the said at least one piece of equipment, the said primary element being linked, on the one hand, to an inertia ring via first elastic means and, on the other hand, to the secondary element via second elastic means.

Such drive devices are well known; they are, for example, mounted at the end of the driving shaft of a motor vehicle and permit the rotational driving of one or (more) piece(s) of equipment, such as an alternator, a fan or another piece of equipment. A device of this kind is described, for example, in the document DE-A-4322710.

Such a drive device is provided so that two main functions are fulfilled, namely a damping function and a filtering function.

The damping function dampens the torsional vibrations of the driving shaft, for example the crankshaft of the engine of the vehicle, thanks to the association of the inertia ring and the first elastic means, the properties of which, inertia and elasticity, are determined as a function of the dynamic characteristics of the driving shaft and the moving equipment linked to it.

The filtering function filters the cyclic irregularities of the driving shaft; in the case of a motor-vehicle engine, it is known that these irregularities appear at low speed and that they impair the correct operation of the engine and the mechanical stability of the pieces of equipment driven by the device; this filtering function is fulfilled by the second elastic means which are chosen to have great torsional flexibility, which is calculated while taking into account the pieces of equipment driven by the device.

Such drive devices work well but, as indicated, their structure and therefore their space requirement is dependent, on the one hand, on the driving component, and even [sic] the driving shaft and the moving equipment linked to it, and, on the other hand, on the piece(s) of equipment which is (or are) driven; it is not always possible therefore, for a given application, to dimension them strictly in accordance with the calculations, which therefore impairs the efficiency and the mechanical stability of the components concerned.

The object of the present invention is to overcome these disadvantages and its subject is a drive device which can be adapted rigorously, whatever the application.

SUMMARY OF THE INVENTION

According to the invention, a device for driving at least one piece of equipment, from a driving shaft, having a torsional vibration damper for rotating masses, which device comprises a primary element intended to be fixed to the driving shaft and a secondary element intended to be connected to the said at least one piece of equipment, the said primary element being linked, on the one hand, to an inertia ring via first elastic means and, on the other hand, to the secondary element via second elastic means, is characterised in that, in operation, the relative rotational displacement, when there is any, between the secondary element and the inertia ring is a relative displacement with friction.

Thanks to this arrangement, these friction means add their action to those of the inertia ring and the elastic element and it is thus possible, by combining these various actions, to find, for a given space requirement, the drive device which is perfectly suited.

Advantageously, friction means are provided between the secondary element and the inertia ring.

According to a preferred embodiment, the secondary element has a rim extending parallel to the axis of the device and the said rim at least partly covers the inertia ring, which has a cylindrical outer face facing the said rim, the friction means being placed between the said rim and the said cylindrical outer face of the inertia ring; advantageously, the friction means are in the form of a cylindrical ring, thus constituting a radial guide bearing.

A drive device in which the secondary element has a rim at least partly covering a cylindrical outer face of the inertia ring is known; this is the case, for example, of the device described in the document already cited above, in which there are no friction means, a bearing in the form of a ball bearing being arranged between the primary element and the secondary element; this is also the case of the device according to the document EP-A-0 667 468, which has a filing date earlier than the filing date of the present application but was published after the filing date of the present application, in which device there are likewise no friction means, a plain bearing without friction being arranged between the secondary element and the inertia ring, this plain bearing being composed of a rubber-like elastic material in which are incorporated particles which reduce wear and stabilise the shape.

Preferably, in the drive device according to the present invention, the said rim is a pulley rim for driving the said at least one piece of equipment by means of a belt.

Advantageously, the primary element is in the general form of a drum of revolution comprising a transverse disc and an axial cylindrical ring which are connected by a slightly conical skirt, the first elastic means being arranged between the said ring and the inertia ring.

Preferably, the second elastic means are placed between a transverse covering of the secondary element and an annular bearing surface of a counter-covering fixed to the primary element.

Advantageously, the second elastic means are prestressed; the prestress is axial; the axial prestress is ensured by a transverse support covering of a support element fixed to the primary element; the support covering is placed opposite the transverse covering of the secondary element; an axial stop element is arranged between the said support covering and the said transverse covering.

Preferably, limiting means are provided for limiting the angular travel of the secondary element with respect to the primary element; the said limiting means comprise at least one nose, carried by the transverse covering of the secondary element, extending axially into an opening formed in the support covering of the support element.

BRIEF DESCRIPTION OF THE DRAWINGS

The invention will be better described with reference to the attached drawings in which.

DETAILED DESCRIPTION OF THE INVENTION

Figure 1:
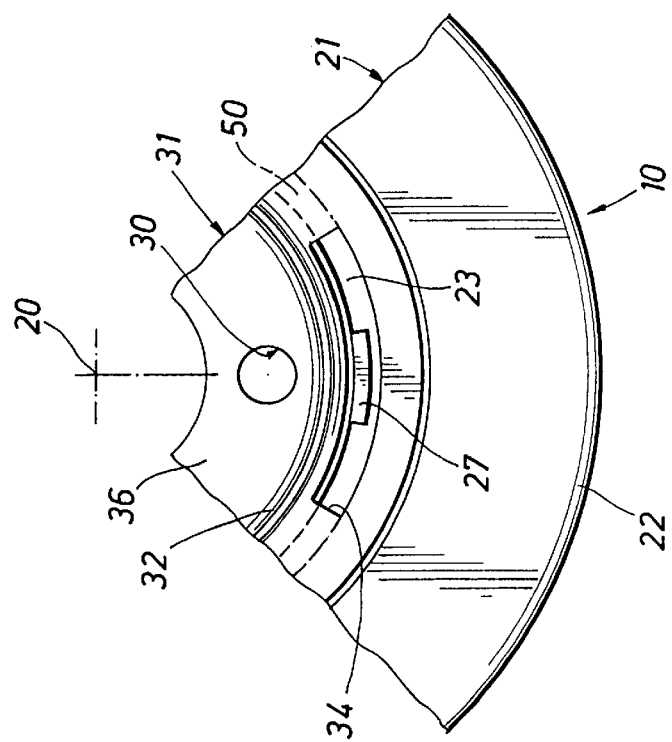
FIG. 1 is a sectional view of a drive device according to the invention.
Figure 2:
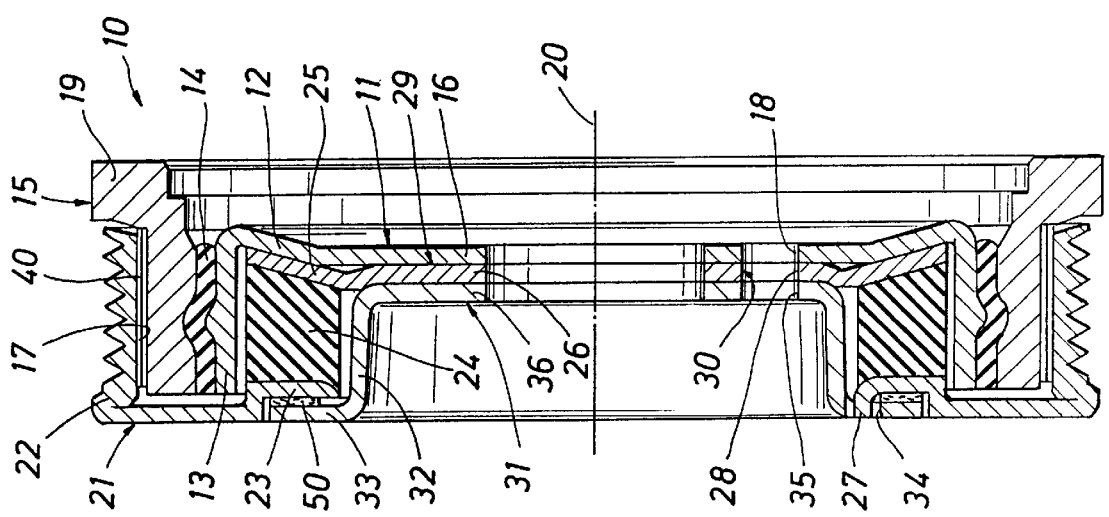
FIG. 2 is a partial view from the left, with respect to FIG. 1, of the device according to FIG. 1.

Referring to FIG. 1, a drive device 10 will be seen which comprises a primary element 11 intended to be fixed to a driving shaft, for example the shaft of the engine of a motor vehicle, and a secondary element 21 intended to be connected to a piece of equipment, for example a piece of equipment of the said vehicle, such as an alternator, a fan or another piece of equipment, for driving the said piece of equipment by the said driving shaft.

The primary element 11 is formed, according to the example shown, of a disc 16 provided with holes 18 for fastening it by screwing to a flange, not shown, placed at the end of the driving shaft. The disc 16 carries, via a connecting skirt 12 of slightly conical shape, a ring 13 of revolution extending parallel to the axis 20 of the device 10, which axis 20 coincides with the axis of rotation of the driving shaft An inertia ring 15 surrounds the ring 13, to which it is fixed via an elastic element 14 mounted in compression between the inertia ring 15 and the ring 13: such an assembly, as known per se, constitutes a damper for damping the torsional vibrations of the driving shaft, the inertia of the ring 15 and the elastic properties of the elastic element 14, often made of elastomer, being adapted, of course, to the dynamic characteristics of the driving shaft and, in particular when the driving shaft is the shaft of the engine of a vehicle, to all the moving equipment of the engine linked to it The inertia ring 15 has a cylindrical outer face 17, whose role will become apparent below, which is limited on one side by a collar 19, of larger diameter, which belongs to the inertia ring 15 and which permits, in particular, the balancing of the said inertia ring 15 by conventional material-removal methods.

The secondary element 21 is formed of a transverse covering 23 to which a pulley rim 22 is connected. The covering 23 of the secondary element 21 is connected to an elastic ring 24, itself fixed to the primary element 11; more precisely, instead of linking the elastic ring 24 directly to the primary element 11, it is preferred to link it to a flared annular bearing surface 25 of a disc 26, itself rotationally fixed to the disc 16 of the primary element 11: thanks to this arrangement, the secondary element 21 comprising the covering 23 and the pulley rim 22, the elastic ring 24 and the disc 26 constitute a subassembly which can be adapted to the particular application in question; advantageously, the flared annular bearing surface 25 exactly follows the slightly conical shape of the skirt 12 of the primary element 11. Disc 26 with its flared annular bearing surface 25 comprise a counter-covering 29.

The pulley rim 22 at least partly covers the inertia ring 15: more precisely, the cylindrical outer face 17 of the inertia ring 15 faces the pulley rim 22; friction means are placed in the gap thus defined between the cylindrical outer face 17 of the inertia ring 15 and the pulley rim 22; these friction means are constructed in the form of a cylindrical ring 40 so that they constitute, furthermore, a radial guide bearing for the pulley rim 22; these friction means add their action to those of the inertia ring 15 and the elastic element 14, that is to say they provide additional damping, through friction, which improves the vibratory attenuation of the natural torsional mode of the driving shaft; thanks to this arrangement, it is also possible, for a given space requirement which is too restricted to receive an inertia ring and/or an elastic element which are/is correctly dimensioned, to compensate for the restrictedness of the space requirement using these friction means.

The role of the elastic ring 24 is to filter the cyclic irregularities of the driving shaft by preventing their transmission to the pieces of equipment via the belt driven by the pulley rim 22; to do this, the elastic ring 24 exhibits great torsional flexibility; it is advantageous, as is known, to mount the elastic ring 24 in an axially stressed manner, so as to reduce the stresses in the material during the active working phase; to this end, a support element 31 is provided; this support element 31 has a support covering 33 placed externally opposite the covering 23 of the secondary element 21; the support covering 33 is connected to a disc 36 by a connecting cone 32; the disc 36 is fixed to the primary element 11; thus, the discs 16, 26, 36 are fixed to one another; this may be obtained by weld points and/or by screwing the three discs onto the flange at the end of the driving shaft, the discs 26 and 36 having holes 28 and 35, respectively, placed in line with the holes 18 of the disc 16 to constitute passages 30 for fastening screws.

An axial stop 50 placed between the covering 23 of the secondary element 21 and the support covering 33 of the support element 31 facilitates the relative circumferential displacement between the covering 23 and the support covering 33, which relative displacement is damped by the elastic ring 24 mounted in axial compression.

Since the elastic ring 24 has great torsional flexibility, it is advantageous to limit the relative circumferential travel between the primary element 11 and the secondary element 21, that is to say between the covering 23 and the support covering 33: to this end, the covering 23 has noses 27, for example three noses 27 spaced regularly circumferentially, which extend, in accordance with the axis 20, into an opening 34 formed in the support covering 33.

The axial positioning of the covering 23, with respect to the end of the driving shaft, obtained by the support covering 33 via the axial stop 50, permits, furthermore, correct positioning of the grooves or ridges of the pulley rim 22.

As has been shown, the drive device according to the invention is of simple and economical construction; it has a torsional vibration damper performing the two main functions, damping and filtering, in a compact assembly having a small number of components.

Of course, the present invention is not restricted to the embodiment described and shown but includes any alternative embodiments.

I claim:

1. A drive device for connection to a driving shaft, the device having a longitudinal axis, comprising:

a primary element adapted for connection to the driving shaft;

an inertia ring fitted about the primary element;

a first elastic means in compression between the inertia ring and the primary element;

a pulley adapted for connection to a piece of equipment, the pulley having a rim extending parallel to the longitudinal axis, the rim at least partly covering the inertia ring, the inertia ring having a cylindrical outer face facing the rim; the pulley having a transverse covering integral with the rim, the transverse covering extending radially between the longitudinal axis and the rim, a second elastic means connected to the primary element and to the pulley, the second elastic means being between the primary element and the pulley, so that, in operation, the relative rotational displacement, when there is any, between the pulley and the inertia ring is a relative displacement with friction; and friction means provided between the rim and the cylindrical outer face of the inertia ring, the friction means being in direct contact with both the rim and the inertia ring; and a support element, the support element having a transverse support covering extending radially from the longitudinal axis, the transverse covering being located axially between the transverse support covering and the second elastic means.

2. A drive device for connection to a driving shaft, the driving shaft having an axis, comprising:

a primary element adapted for connection to the driving shaft;

an inertia ring fitted about the primary element;

a first elastic means in compression between the inertia ring and the primary element;

a secondary element adapted for connection to a piece of equipment;

a second elastic means connected to the primary element and to the secondary element, so that, in operation, the relative rotational displacement, when there is any, between the secondary element and the inertia ring is a relative displacement with friction;

friction means provided between the secondary element and the inertia ring, the friction means being in direct contact with both the secondary element and the inertia ring; and a counter-covering connected to the primary element, the counter-covering having a transverse bearing surface, wherein the secondary element has a transverse covering, the second elastic means being located between the transverse covering and the bearing surface.

3. The device of claim 2, wherein the second elastic means is axially prestressed, and wherein the secondary element has a pulley rim integral with the transverse covering.

4. The device of claim 2, further comprising a support element connected to the primary element, the support element having a transverse support covering for providing axial compression to the second elastic means.

5. The device of claim 4, wherein the transverse support covering is placed axially opposite the transverse covering of the secondary element.

6. The device of claim 5, further comprising an axial stop element between the transverse support covering and the transverse covering of the secondary element.

7. The device of claim 6, further comprising limiting means for limiting the angular travel of the secondary element with respect to the primary element.

8. The device of claim 7, wherein the limiting means comprises at least one nose carried by the transverse covering of the secondary element, wherein the transverse support covering of the support element has an opening and the nose extends axially into the opening.

9. A drive device for connection to a driving shaft; comprising:

a primary element adapted for connection to the driving shaft, the primary element having the general form of a drum of revolution comprising a transverse disc, an axial cylindrical ring, and a slightly conical skirt connecting the transverse disc and the axial cylindrical ring;

an inertia ring fitted about the primary element;

a first elastic means in compression between the inertia ring and the axial cylindrical ring of the primary element;

a secondary element adapted for connection to a piece of equipment;

a second elastic means connected to the primary element and to the secondary element, the second elastic means being between the primary element and the secondary element, so that, in operation, the relative rotational displacement, when there is any, between the secondary element and the inertia ring is a relative displacement with friction;

friction means provided between the secondary element and the inertia ring, the friction means being in direct contact with both the secondary element and the inertia ring, and a counter-covering connected to the primary element, the counter-covering having a bearing surface, wherein the secondary element has a transverse covering, the second elastic means being located between the transverse covering and the bearing surface.

10. A drive device for connection to a driving shaft, comprising:

a primary element adapted for connection to the driving shaft;

an inertia ring fitted about the primary element, the inertia ring having a cylindrical outer face;

a first elastic element in compression between the inertia ring and the primary element;

a secondary element adapted for connection to a piece of equipment, the secondary element having a rim extending essentially parallel to a longitudinal axis of the driving shaft, the rim facing the cylindrical outer face of the inertia ring, the rim at least partly covering the cylindrical outer face of the inertia ring;

a friction ring between the rim and the cylindrical outer face of the inertia ring, the friction ring providing a radial guide bearing, the friction ring being in direct contact with both the rim and the cylindrical outer face of the inertia ring;

a second elastic means connected to and between the primary element and the secondary element so that, in operation, the relative rotational displacement, when there is any, between the secondary element and the inertia ring is a relative displacement with friction; and a counter-covering connected to the primary element, the counter-covering having a beating surface, the secondary element having a transverse covering, the second elastic means being located between the transverse covering and the bearing surface.

11. An apparatus for providing torsional vibration damping, comprising:

a primary element having a disc portion connectable to a shaft, the shaft having an axis, the primary element having a ring portion located circumferentially about the axis, the primary element having a skirt connecting the ring portion to the disc portion;

a first elastic means fitted about the ring portion of the primary element;

an inertia ring fitted about the first elastic means, the first elastic means being in compression;

a second elastic means connectable to the primary element, the second elastic means having the shape of a ring placed circumferentially about the axis;

an integral secondary element connected to the second elastic means, the secondary element having a transverse covering extending radially from the axis, the secondary element having a rim extending essentially parallel to the axis, the rim at least partly covering the inertia ring; and a support element connectable to the disc portion of the primary element, the support element having a transverse support covering extending radially from the axis, the transverse covering of the secondary element being located axially between the transverse support covering and the second elastic means, wherein the inertia ring has a cylindrical outer face and the rim of the secondary element has a cylindrical inner face opposing the outer face of the inertia ring, further comprising a cylindrical ring between the outer face of the inertia ring and the inner face of the rim for providing friction and a radial guide bearing, the cylindrical ring being in direct contact with the outer face of the inertia ring and with the inner face of the rim.

12. The apparatus of claim 11, further comprising an axial stop element between the transverse support covering of the support element and the transverse covering of the secondary element.

13. An apparatus for providing torsional vibration damping, comprising:

a primary element having a disc portion connectable to a shaft, the shaft having an axis, the primary element having a ring portion located circumferentially about the axis, the primary element having a skirt connecting the ring portion to the disc portion;

a first elastic means fitted about the ring portion of the primary element;

an inertia ring fitted about the first elastic means, the first elastic means being in compression;

a second elastic means connectable to the primary element, the second elastic means having the shape of a ring placed circumferentially about the axis;

an integral secondary element connected to the second elastic means, the secondary element having a transverse covering extending radially from the axis, the secondary element having a rim extending essentially parallel to the axis, the rim at least partly covering the inertia ring; and a support element connectable to the disc portion of the primary element, the support element having a transverse support covering extending radially from the axis, the transverse covering of the secondary element being located axially between the transverse support covering and the second elastic means, wherein the transverse covering of the secondary element has at least one nose extending axially and the transverse support covering of the support element has at least one opening for receiving the nose, the nose having a limited freedom of movement within the opening, the nose contacting the transverse support covering of the support element to limit rotational displacement between the transverse covering of the secondary element and the transverse support covering of the support element when the support element is connected to the primary element.

* * * * *